United States Patent [19]

Olbertz

[11] Patent Number: 5,629,516
[45] Date of Patent: May 13, 1997

[54] OPTICAL SCANNING APPARATUS WITH THE ROTATION OF ARRAY INTO TWO DIRECTIONS

[75] Inventor: Antonius H. M. Olbertz, Hengelo, Netherlands

[73] Assignee: Hollandse Signaalapparaten B.V., Hengelo, Netherlands

[21] Appl. No.: 187,487

[22] Filed: Jan. 28, 1994

[30] Foreign Application Priority Data

Feb. 19, 1993 [NL] Netherlands ............................. 9300312

[51] Int. Cl.$^6$ ............................. H04N 1/14; G01B 11/26
[52] U.S. Cl. ....................... 250/208.1; 250/234; 244/3.16; 356/141.5
[58] Field of Search ............................. 250/208.1, 234, 250/235, 236; 244/3.16; 356/141.5

[56] References Cited

U.S. PATENT DOCUMENTS 3,889,117  6/1975  Shaw, Jr. ............................. 250/208.1
4,193,688  3/1980  Watkins ............................. 356/141.5
4,314,761  2/1982  Reymond et al. ............................. 356/141.5
5,391,867  2/1995  Grumberg ............................. 250/208.1

FOREIGN PATENT DOCUMENTS 0412036  2/1991  European Pat. Off.

OTHER PUBLICATIONS

Patent Abstracts of Japan, vol. 6, No. 103, Jun. 12, 1982 & JP, A, 57 035 468.

Primary Examiner—Stephone Allen
Attorney, Agent, or Firm—Oblon, Spivak, McClelland, Maier & Neustadt, P.C.

[57] ABSTRACT

An optical scanning apparatus having a linear detector array and a lens for focusing an image on the array contained within a camera housing. The housing can be rotated around a first axis so as to scan from side to side. In addition, the linear detector array can be rotated around an axis parallel to the direction of sight of the camera to enhance the signal/noise ratio.

3 Claims, 4 Drawing Sheets

OPTICAL SCANNING APPARATUS WITH THE ROTATION OF ARRAY INTO TWO DIRECTIONS

BACKGROUND OF THE INVENTION

The invention relates to an optical scanning apparatus, comprising a linear detector array, optical imaging means for imaging an image to be scanned on the array and scanning means for at least substantially perpendicularly shifting, in a first operational mode, the image with respect to the array.

SUMMARY OF THE INVENTION

Such an apparatus is well-known and finds particular application in infrared detection equipment.

The apparatus according to the invention has for its object to realize, in a relatively simple, yet inventive way, an improved signal/noise ratio based on the existing means. This is possible by, for instance, reducing the scanning speed. In the majority of cases, however, this is undesirable. Other possibilities in this respect involve the incorporation of an increased number of elements per array length, which however entails considerable cost.

The apparatus according to the invention is characterised in that the scanning apparatus is provided with rotation means for rotating the array, in a second operational mode, such that the array is not at right angles to the scanning direction.

The advantage of this provision is that the signal/noise ratio can be improved while retaining the scanning speed and without introducing any modifications to the detector and the optical system.

A favourable embodiment of the apparatus provided with a preprocessor for the preamplification and time-division multiplexing, per detector element, of electric signals to be delivered by the array is characterised in that the preprocessor is provided with detector element-adjustable delay means for compensating relative time delays of the electric signals originating from the detector elements at a non-perpendicular position.

This has the considerable advantage that image distortions do not occur and that use can be made of the same signal processing as employed in the perpendicular position.

Another favourable embodiment of the apparatus, its array comprising N elements is characterised in that the preprocessor is provided with a summing network with N inputs connected to the time-delayed electric signals for generating M output signals, M<N, at a non-perpendicular position. This entails an enhancement of the signal/noise ratio and consequently, an increased sensitivity.

BRIEF DESCRIPTION OF THE DRAWINGS

The apparatus will now be described with reference to the following figures, of which.

DETAILED DESCRIPTION OF THE INVENTION

Figure 1:
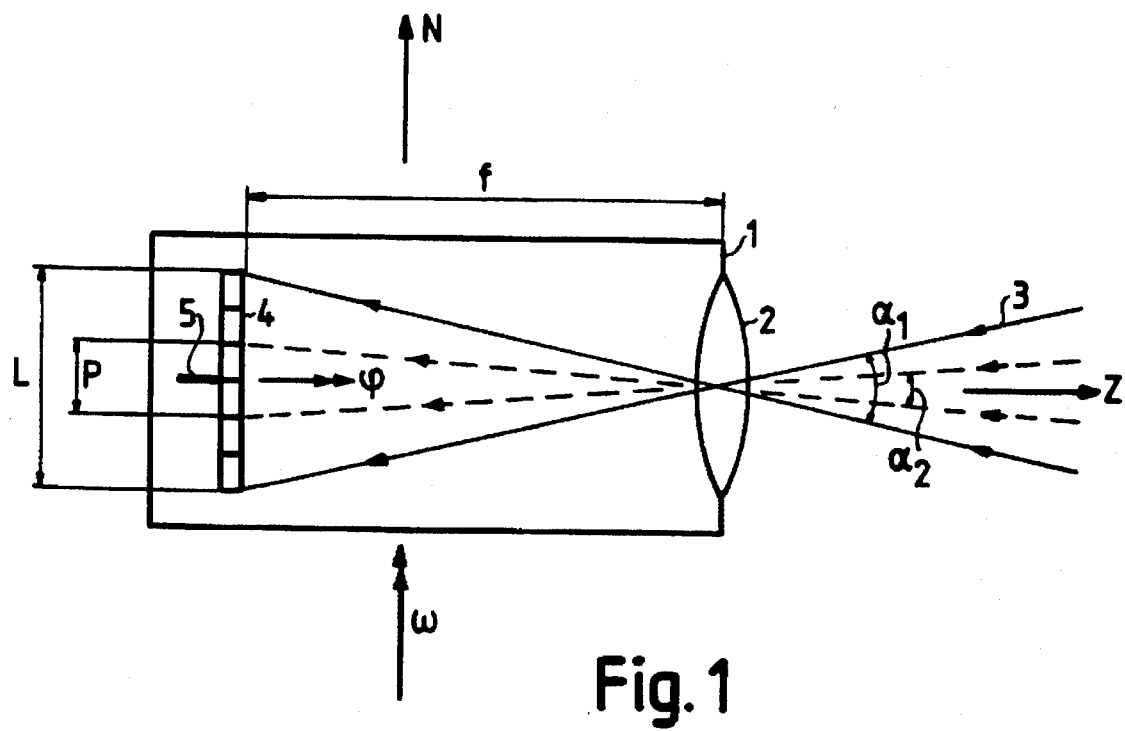
FIG. 1 represents a side-view of the apparatus according to the invention.

FIG. 1 represents a side-view of an embodiment of the optical scanning apparatus, comprising a camera housing 1, an optical imaging facility in the form of a lens 2 for focussing a beam of light 3 from the direction of sight Z, which contains information of the image to be imaged and the consequent imaging of the image on an array 4, which in this embodiment is of the linear type and which is provided with optically sensitive elements. The beam of light 3 enters the lens under an angle of aperture $$\alpha_1 = 2\,\text{atan}\left(\frac{L}{2f}\right),$$

in which

L=array length
f=focal distance

The array used in this embodiment is a linear one, although other array types, such as staggered arrays, may also be considered.

Instead of one lens it is also possible to use a system of lenses.

In the embodiment described here, the scanning apparatus is rotatable around an axis N. The scanning apparatus will usually perform a uniform scan at an at least substantially constant angular velocity $\omega$. In the present embodiment the direction of sight Z is perpendicular to the axis of rotation N, but in other embodiments Z and N may enclose an angle.

The scanning apparatus can also be installed on a stabilized platform to be mounted on a vehicle or a ship such that the camera at least substantially continues to rotate in a predetermined, usually, horizontal plane or constitutes an at least substantially constant angle with this plane. In a first operational mode, the scan will cause the image to be shifted perpendicularly with respect to the array, or at least substantially so.

Figure 2:
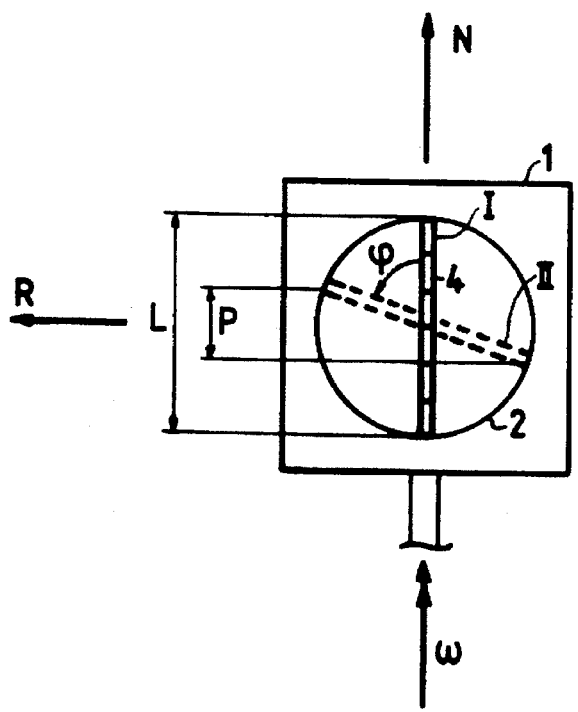
FIG. 2 represents a front view of the apparatus according to the invention.

FIG. 2 represents a front view of an embodiment of the apparatus according to the invention. The array is presented in a first operational mode I, thus being substantially perpendicular to the scanning direction R, in which direction, as a result of the scan performed, images from the surroundings as far as these are contained in the beam having an angle of aperture $\alpha_1$, are scanned by the detector array. Furthermore, the array is presented in a second operational mode II, the array being rotated by an angle $\theta$ with respect to the position of the detector array in operational mode I. The axis of rotation 5 for rotating the array is at least substantially in line with the direction of sight. Thus, the array is no longer perpendicular to the scanning direction R, but encloses an angle $\theta$ with the scanning direction R. Consequently, the detector array receives images only insofar as these are contained in a beam having an angle of aperture $\alpha_2<\alpha_1$. $\alpha_2$ is determined by a projected length P=L cos $\theta$, L being equal to the total length of the array. For the new angle of aperture, the following applies:

$$\alpha_2 = 2\,\text{atan}\left(\frac{L\cos\phi}{2f}\right),$$

This consequently narrows the angle of aperture, without the number of array elements used being reduced. The application of this principle is based on the need to make observations within a smaller area on the basis of an improved signal/noise ratio.

Figure 3A:
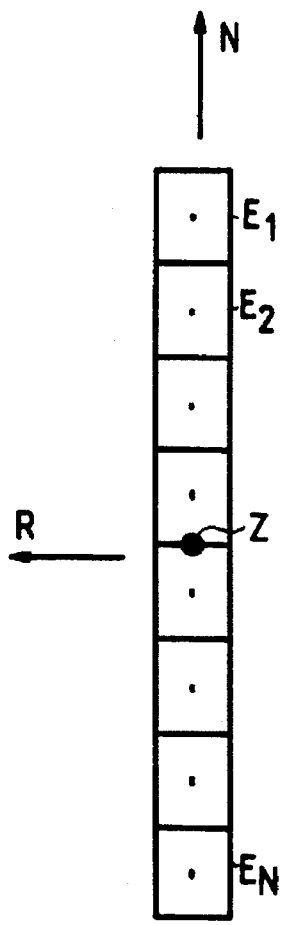
FIG. 3A represents an array in a position perpendicular to the scanning direction.

FIG. 3A separately represents the position of an array in the first operational mode. The rotation of the scanning apparatus about the axis N causes the array to move in a plane perpendicular to the axis N (the search plane), whereby picture information mainly being in a plane perpendicular to the search plane and in the direction of sight Z is received by the separate array elements within the angle of aperture $\alpha_1$, the picture information being converted per array element into electric signals representing an intensity.

Figure 3B:
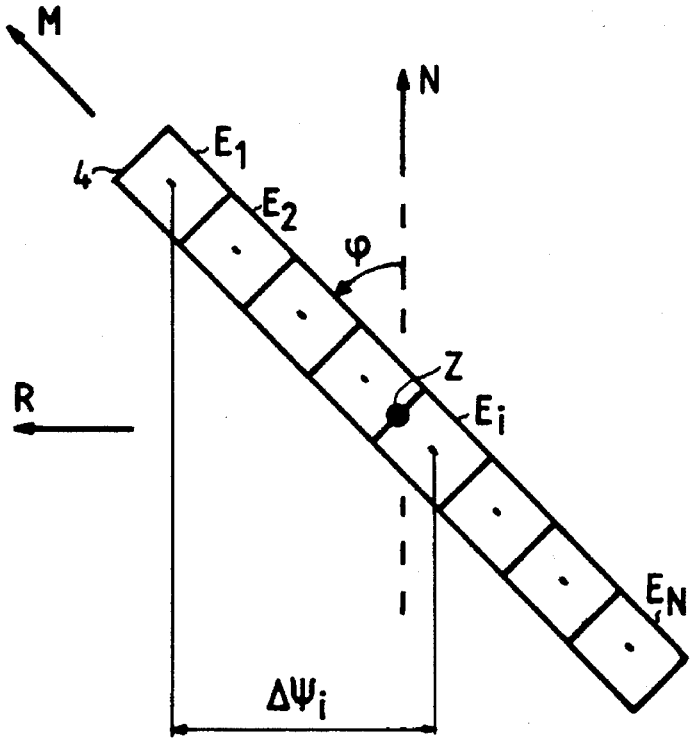
FIG. 3B represents an array in a position not perpendicular to the scanning direction.

FIG. 3B shows how in a second operational mode, an axis M representing the longitudinal direction of the array elements, determines jointly with the direction of sight Z a plane which, with the axis of rotation N, includes an angle $\theta$. In actual practice, it will usually be verified that the axis M is at least substantially perpendicular to the axis Z. Z is by no means required to be perpendicular to N, although for the sake of clarity, perpendicularity is suggested in the figure.

Owing to the array inclination, a band having height $L.\cos\theta$ is scanned in the scanning direction. This band corresponds with a narrower angle of aperture $\alpha_2$. As a consequence, a narrower angle of aperture is scanned with the same number of array elements, which yields an enhanced signal/noise ratio.

A consequence of the array inclination, as indicated in the figure, is that a lower array element $E_i$ receives the picture information which is mainly contained in a certain fixed plane V perpendicular to the search plane earlier than a higher array element $E_j$, $i>j$. If, for instance, the upper array element $E_1$ serves as a reference for determining the plane V at a point of time t, the azimuth angle through which the scanning apparatus is to rotate about the axis N in order to rotate a lower element $E_i$ into the plane V, is equal to $\Delta\psi_i$, as is indicated in FIG. 3B. At an angular velocity $\omega$, the corresponding difference in time by which the element $E_i$ receives the picture information in the plane V earlier, is equal to:

$$\Delta T_i = \frac{\Delta\psi_i}{\omega}.$$

Figure 4:
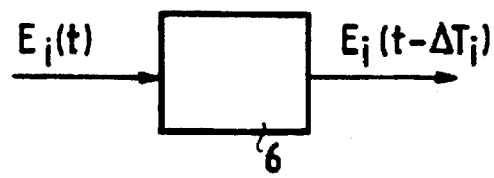
FIG. 4 represents a delay means adjustable per detector element.

In order to employ the same signal processing as employed in the vertical position, which signal processing is usually applied to the electric signals of the separate array elements to obtain an overall image and to compensate for measuring noise, each separate signal per array element $E_i$ can now be delayed in a preprocessor over a time span $\Delta T_i$, in accordance with FIG. 4 in which block 6 represents a delay line. In actual practice the signals originating from the separate array elements will include time-discrete signals, so that a shift register may be used for the delay line. As the angle $\Delta\psi_i$ per array element depends on the inclination $\theta$ and the angular velocity $\omega$, the delay lines shall be adjustable per array element. An additional advantage of this method is that image distortion is prevented.

Figure 5:
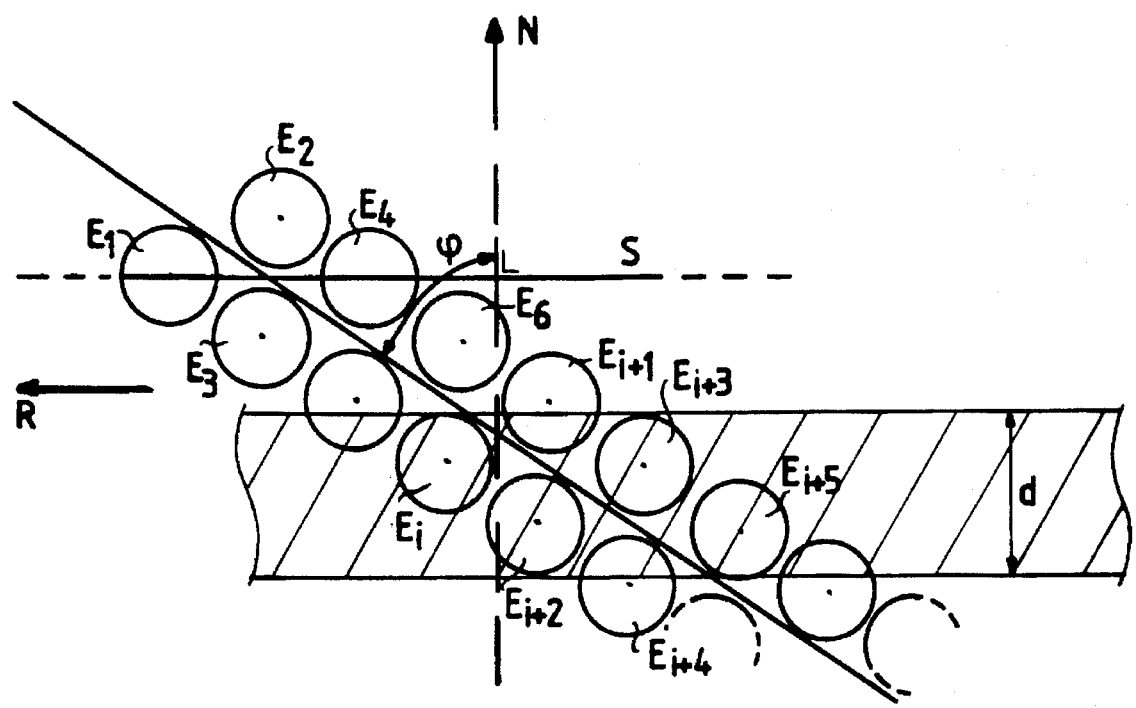
FIG. 5 a staggered linear array in a position no longer perpendicular to the scanning direction.

FIG. 5 shows how, when using a linearly staggered array predominantly consisting of substantially circular array elements, signals from different array elements can, after an array-element specific time delay, be combined via a summing network or, preferably, via a linear combination network. It can be seen that, depending on the inclination $\theta$ of the array, for certain different discrete values of $\theta$, each array element is paired to another array element, which pairs move in practically the same plane S perpendicular to the rotation axis. A suitable method for enhancing, per pair of elements, the signal/noise ratio is to add, subsequent to time-delaying the signal originating from an element, the separate signals originating from the elements in the pair. Each pair of elements then produces a new signal $F_i$. For the angle $\theta$, as can be seen in the figure, the respective new signals per pair of elements become:

$$F_i(t) = E_i(t-\Delta T_i) + E_{i+3}(t-\Delta T_{i+3}).$$

As is illustrated in the figure, it is also possible to define slices, perpendicular to the axis of rotation N, each slice having a thickness d, and to combine the signals from elements moving within the same slice, after an element-specific time delay and preferably by means of a linear combination network. The thickness d will then preferably be such that exactly k, k>1 elements move within a slice. In this way, a clustering of k elements takes place. In FIG. 5, k=4 and the elements $E_i$, $E_{i+2}$, $E_{i+3}$ and $E_{i+5}$ are contained in a slice. The slices can be defined such that separate clusters arise which do not overlap.

Figure 6:
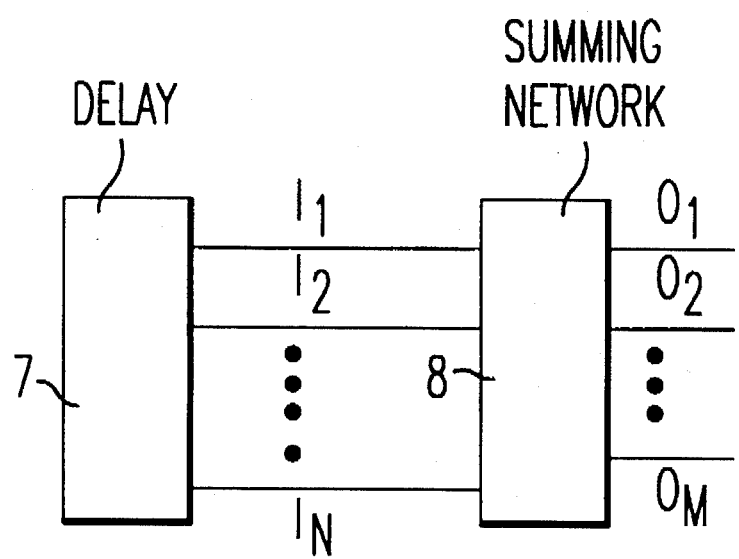
FIG. 6 represents a summing network used in conjunction with a delay means of the present invention.

FIG. 6 shows the connection between the delay and the summing network mentioned above. Delay 7 produces a number of outputs $I_1, I_2 \ldots I_N$ which form the input to the summing network 8. The delay 7 includes a series of delay elements such as shown in FIG. 4. The summing network produces a series of outputs $O_1, O_2 \ldots O_M$, where M<N.

In a preferred embodiment the slices are defined such that successive clusters coincide, barring one element or pair of elements, as a result of which the clusters overlap.

Finally it should be noted that clustering can also be performed while using a single linear array.

I claim:

1. Optical scanning apparatus having first and second modes of operation, said optical scanning apparatus comprising:
    a camera housing;
    a linear detector array comprising a plurality of detector elements;
    at least one lens for focusing a beam of light from a direction of sight Z onto the linear detector array; first rotation means for rotating the camera housing around an axis N which is not parallel to the direction of sight Z; wherein, in order to change the angle of aperture of the optical scanning apparatus, the detector array is provided with second rotation means for rotating the detector array from a first position relating to the first mode of operation to a second position relating to the second mode of operation, around an axis which is at least substantially parallel to the direction of sight Z.

2. Optical scanning apparatus as claimed in claim 1, further comprising:
    a processor for amplifying and time-division multiplexing electric signals generated by each detector element of the linear detector array;
    wherein the processor further comprises per detector element adjustable delay means for compensating relative time delays of electric signals from each element of the linear detector array when the scanning apparatus is in the second mode of operation.

3. Optical scanning apparatus as claimed in claim 2, the array further comprising N elements, wherein the processor is provided with a summing network with N inputs connected to the delay means, which summing network is arranged to produce M output signals, M<N when the scanning apparatus is in the second mode of operation.

* * * * *